United States Patent [19]

DeFrees

[11] 4,040,456
[45] Aug. 9, 1977

[54] OPENABLE BOTTOM LOADING ADAPTER FOR TRANSPORT TANK

[76] Inventor: Joseph H. DeFrees, 505 Liberty St., Warren, Pa. 16365

[21] Appl. No.: 652,985

[22] Filed: Jan. 28, 1976

[51] Int. Cl.² .................. B67C 11/04; B65B 39/00
[52] U.S. Cl. .................. 141/349; 141/113; 251/149.6; 251/323; 251/107
[58] Field of Search ............ 251/251, 259, 231, 318, 251/323, 101, 107, 149.6; 137/322, 522, 542, 543, 543.13, 410; 141/113, 346–362

[56] References Cited

U.S. PATENT DOCUMENTS

| 850,752 | 4/1907 | Heidorn | 251/251 |
| 940,556 | 11/1909 | Robinson | 251/251 |

FOREIGN PATENT DOCUMENTS

| 434,038 | 9/1926 | Germany | 251/251 |
| 627,023 | 10/1961 | Italy | 251/251 |

Primary Examiner—Houston S. Bell, Jr.
Attorney, Agent, or Firm—Baldwin, Egan, Walling & Fetzer

[57] ABSTRACT

A fabricated adapter valve for mounting on the exterior of a transportation tank for liquid, such as for instance gasoline or oil, providing for coupling with a compatible loading coupler of a loading island, for loading the liquid into the transportation tank. The adapter valve possesses a configuration defined by The American Petroleum Institute for universal coupling with loading couplers of a loading station, and includes a manually operable actuator for opening the poppet of the adapter valve, together with a sinuous-like cam configuration on the actuator for holding the poppet in predetermined open positions.

10 Claims, 5 Drawing Figures

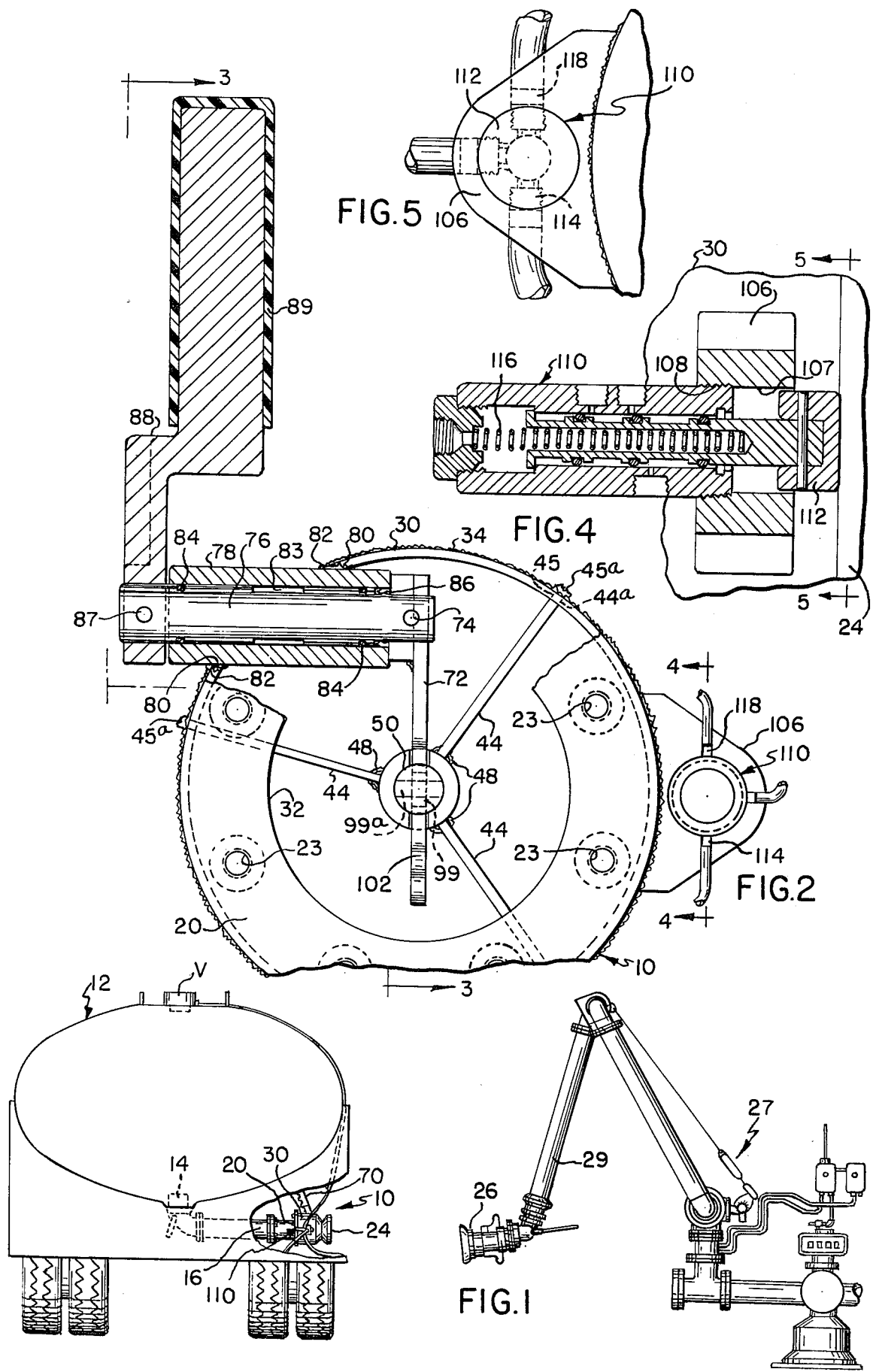

4,040,456

OPENABLE BOTTOM LOADING ADAPTER FOR TRANSPORT TANK

This invention relates in general to adapter valves for use with a transportation tank, such as used for instance for inflammable liquids, and more particularly relates to an adapter valve having a manually operable actuator for selectively opening the poppet at the entry end of the adapter valve, and including means for expeditiously holding the poppet in predetermined open positions.

BACKGROUND OF THE INVENTION

Manually openable adapter valves are known in the prior art for loading fluid into a transportation tank. Also known are means for holding the poppet of the adapter valve in predetermined open positions. However, such arrangements heretofore have usually been somewhat complex, resulting in increased costs for the adapter valve mechanism. U.S. patent application, Ser. No. 633,629, filed Nov. 20, 1975, in the name of Joseph H. DeFrees and entitled Adapter Valve Mechanism For Transportation Tank, discloses various types of adapter valves.

SUMMARY OF THE INVENTION

The present invention provides an adapter valve arrangement of fabricated construction having a novel actuator arrangement for holding the poppet of the valve in predetermined conditions.

Accordingly, an object of the invention is to provide a novel adapter valve for use with a transportation tank for liquids, such as inflammable liquids.

Another object of the invention is to provide a valve of the aforementioned type which is of an uncomplex nature, and which includes an actuator for opening the poppet of the adapter valve, and for automatically holding the poppet is predetermined open position by means of sinuous-like cam means.

Another object of the invention is to provide a valve of the above type which includes a manually operable actuator having a cam arm extending into the valve body through a slot in the associated poppet stem, and adapted for coaction with a roller abutment on the stem, for moving the poppet to open position against the resistance to compression of an associated biasing means, and wherein the cam arm includes a sinuous-like configuration thereon which is adapted to coact with the roller to automatically hold the poppet in selected open positions.

Other objects and advantages of the invention will be apparent from the following description taken in conjunction with the accompanying drawings wherein:

BRIEF DESCRIPTION OF THE DRAWINGS

FIG. 1 is a diagrammatic illustration of a typical installation of an adapter valve of the invention on a transportation tank vehicle at a conventional loading station.

FIG. 2 is a partially broken, enlarged end elevational view of the valve shown in FIG. 1.

FIG. 4 is an enlarged, vertically sectional view of an air valve mounted on the adapter valve, which is adapted for automatic actuation by the loading coupler of the loading island, to actuate a predetermined component of the transportation tank, and is taken generally along the plane of line 4—4 of FIG. 2.

FIG. 5 is a view of the air valve of FIG. 4 taken generally along the plane of line 5—5 thereof.

DESCRIPTION OF THE PREFERRED EMBODIMENT

Figure 3:
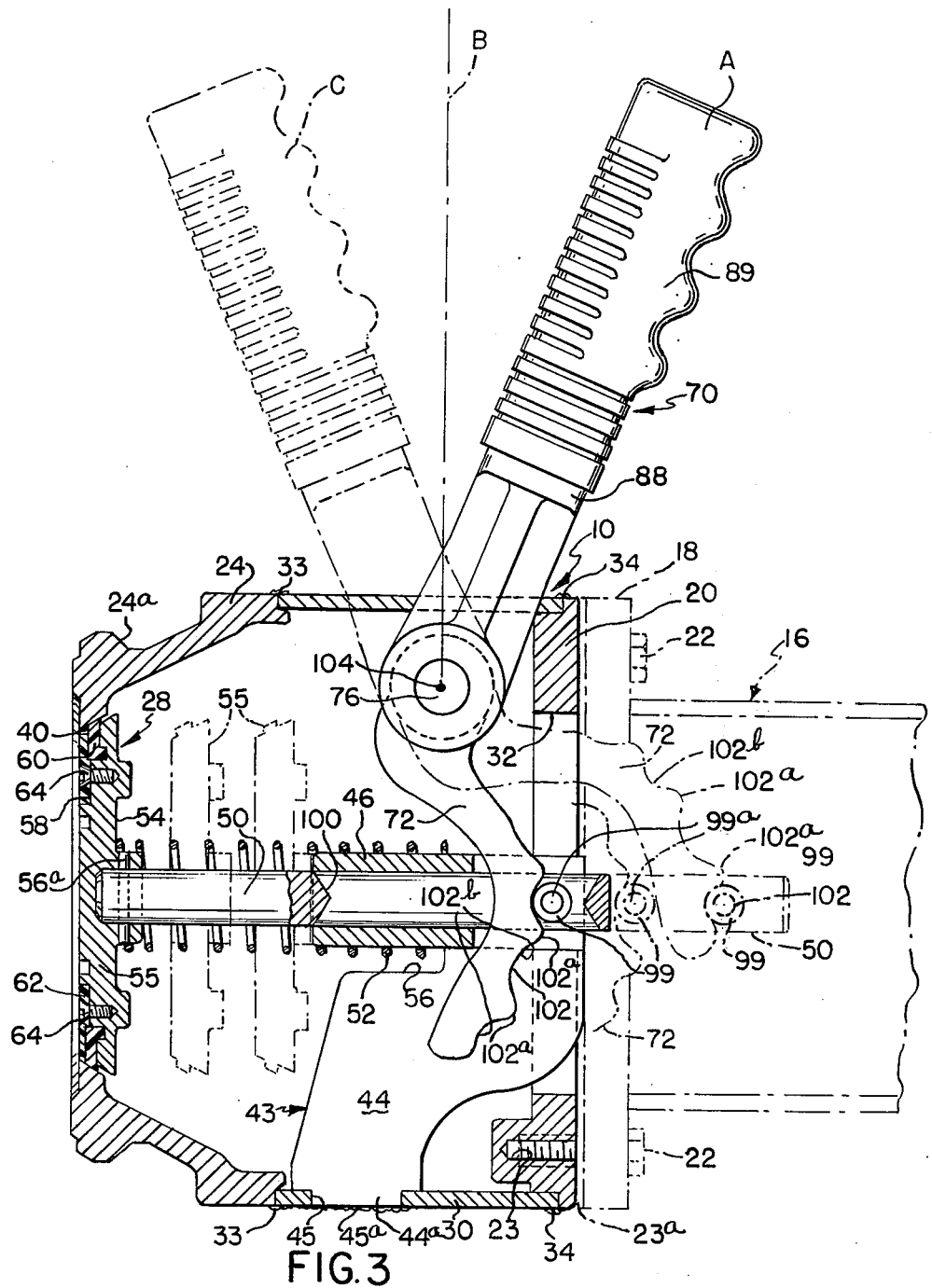
FIG. 3 is a sectional view taken generally along the plane of line 3—3 of FIG. 2, looking in the direction of the arrows. In phantom lines there is shown various open positions of the associated poppet of the adapter valve.

Referring now again to the drawings, there is shown diagrammatically in FIG. 1 an adapter valve 10 embodying the invention, and mounted on a liquid transportation tank 12. Associated with the lower portion of the tank may be an emergency valve 14 of known construction, such as for instance the type illustrated in U.S. Pat. No. 3,029,833 to Joseph H. DeFrees dated Apr. 7, 1962. The emergency valve 14 may be coupled as by means of a conduit or line 16 to the adapter valve structure 10 of the invention, with line 16 having a flange 18 thereon (FIG. 3) adapted for coupling to the flange portion 20 of the adapter valve. Flange 18 of line 16 can be coupled as by means of conventional threaded fasteners 22 as illustrated, received in complementary threaded openings 23 (FIGS. 2 and 3) in the flange portion 20. A sealing gasket 23a is preferably provided between flanges 20 and 18.

Adapter valve 10 includes a coupling portion 24 having an exterior configuration 24a as established by The American Petroleum Institute, and which is adapted for rapid connection with compatible loading coupler 26 of a conventional loading island 27 (FIG. 1) for liquids to be transported by the storage tank 12. Such loading island conventionally includes a loading assembly comprising an arm 29 including the aforementioned loading coupler 26 at one end thereof, for liquid tight coupling with the coupling portion 24 of the adapter valve, thus providing for applying liquid under pressure to the adapter valve from whence it flows via line 16 and the emergency valve 14 into the tank interior during a bottom loading operation. The loading coupler 26 at the loading island may have conventional means associated therewith (not shown) for manually opening the poppet valve structure 28 mounted interiorly of the adapter valve 10, for permitting the ready inflow of liquid into the body portion 30 of the adpater valve and then out the liquid exit opening 32 in the flange portion 32 in the flange portion 20 to the aforementioned line 16.

As can be seen, the body 30 of the adapter valve is preferably of generally cylindrical, open ended configuration and which is secured at one end thereof, as by means of welds 33, to the coupling portion 24 in liquid tight relation. At its other end, body 30 is secured as by welds 34 to the aforementioned flange portion 20. Liquid inlet opening 40 in the coupling portion 24 is normally closed by the aforementioned poppet 28 which is maintained in position by a fabricated spider 43.

Spider 43 in the embodiment illustrated comprises three relatively thin arms 44, each of which includes a tab portion 44a (FIG. 3) received in complementary slot 45 in the body portion of the valve. Preferably welds 45a provide a liquid tight connection between the spider arms and the body portion, and rigidly position spider 43.

Arms 44 support a lengthwise extending sleeve 46 thereon which is preferably connected as by welds 48 to the arms. Elongated base stem 50 of the poppet 28 is received interiorly of the sleeve 46 in ready sliding, guided relation therein. A spring 52 coacting between the rear face 54 of the poppet head 55 and a well 56 formed by the arms 44, urges the poppet head toward closed position. Pin 56a may connect the poppet head to the stem 50. In this embodiment of adapter valve, the axis of the exit opening 32 in the valve is generally concentrically disposed relative to the axis of the inlet opening 40.

The poppet valve head 55 on its forward face is preferably provided with a circumferential step-like recess 58 therein, as illustrated, in which there is disposed an L shaped (in transverse section) sealing ring 60, held in place by a circular retainer plate 62 which in turn is detachably secured as by means of threaded fasteners 64 to the head 55. It will be seen that access to the sealing ring 60 is readily accessible from exteriorly of the adapter valve, thus providing for easy replacement of the sealing ring if necessary. The deep tapered defining surface of the inlet opening 40 into the adapter valve helps to prevent the poppet from binding during opening movement of the poppet valve away from the liquid entry opening. Also such a deep tapered seat aids in providing a seal with the poppet head in the event that the sealing ring 60 is damaged or lost.

The spider 43 effectively maintains poppet valve 28 in position in the interior of the adapter valve and in alignment with the inlet opening 40. It also presents relatively little interruption to the volume flow of liquid through the adapter valve. In fact, the spider assembly mounting the poppet valve thereon serves as a vortex breaker and actually facilitates smooth flow of liquid into line 16 during the loading operation.

The exterior configuration of the adapter valve is generally uninterrupted as can be best seen in FIGS. 1 and 3, aiding in preventing accumulation of ice and dirt on the outside of the valve while the transportation tank is in service.

Mounted on the body portion 30 of the adapter valve is a manually operable lever or actuator mechanism 70 coacting with the poppet 28 for manually opening the poppet, thus providing a valve arrangement operable to manually open the poppet during an unloading operation of the transportation tank, when the coupling portion 24 of the adapter valve is coupled to a discharge hose (not shown) equipped with a compatible coupling head for unloading the transportation tank via the adapter valve.

Actuator 70 includes a generally arcuate cam arm 72 secured as by means of a pin 74 to shaft 76 which is rotatably journaled as by means of a stuffing box sleeve bearing 78 which projects laterally through opening 80 of the body and is welded thereto in liquid tight relation as by means of welds 82. Shaft 76 may include a grease cavity 83 and may also include sealing means, such as O rings 84 and spring loaded Teflon seal 86, which are adapted to seal the stuffing box sleeve 78 against leakage of liquid from the adapter body.

The outer end of the shaft 76 projects outwardly beyond the stuffing box sleeve 78, and is connected as by means of a pin 87, to operating handle 88 which extends upwardly above the adapter valve. A vinyl hand grip 89 may be provided over the handle.

The base shaft 50 of the poppet 28 includes a preferably movable abutment 99 such as for instance the illustrated roller, which may be rotatably mounted as by means of a pin 99a to the base stem, and which is disposed in a slot 100 formed in the stem.

In accordance with the invention, the cam arm 72 is provided with a sinuous-like configuration 102 thereon, comprising spaced projections 102a separated by valley portions 102b. Configuration 102 is adapted for engagement with the abutment 99 on the poppet stem and upon forward actuation of the operating handle 88 is adapted to move the poppet 88 from closed to open position. It will be seen that the in moving the handle from the full line inactive position A (FIG. 3) to the phantom position B, sinuous-like surface 102 of the cam arm is swung rearwardly and abutment 99 rolls over the adjacent projection 102a and into adjacent valley 102b. If the handle is released, the coaction between abutment 99 and the confronting surface holds the handle in such position to maintain the poppet in partially opened condition. When the handle is moved from partially actuated position B to the fully actuated position C, the shaft 76 actuates the cam arm which moves the poppet 28 to fully opened position. In moving from postion B to C, the roller 99 rolls along the surface 102 over the adjacent projection 102a and into adjacent valley 102b. Upon release of the handle 88, the coaction between abutment 99 and the confronting surface 102 automatically holds the poppet valve is fully opened position. It is possible, of course, to go directly from fully closed position A to fully opened position C without stopping or pausing in the intermediate position B. The effective force applied by the abutment 99 to the confronting portion of surface 102 is so arranged so as to be applied generally rearwardly of the pivotal axis 104 of the handle 88, and is sufficient to overcome the force being applied by spring 52 to close the poppet. Thus the poppet remains in the position to which it is moved by cam arm 72.

The various parts of the actuator valve mechanism are preferably formed of some lightweight material, such as for instance aluminum, and which may be assembled and welded into the finalized valve arrangement illustrated.

Projecting from one side of the body portion 30 of the adapter valve is a flange 106 having an opening 107 therethrough, with the opening being threaded through a portion thereof, as at 108, for receiving therein a control valve arrangement 110 and mounting the same on the body of the adapter valve. The valve is a three way valve which includes a plunger 112 projecting outwardly of the flange. When the coupler head 26 of the loading island 27 is attached to the coupling portion 24 of the adapter valve, the head 26 automatically depresses the plunger 112 permitting actuating fluid, such as pressurized air at conduit inlet 114 to the control valve 110, to be transmitted via exit port 118 to an air actuated unit of conventional type, (not shown) associated with a vent (e.g. V) on the transportation tank 12 (FIG. 1) for automatically opening the vent, thus preventing vapor pressure build-up in the transportation tank. Also, such control valve arrangement 110 could be utilized additionally or instead of for setting the brakes on the transportation tank vehicle. When the loading head of the loading arm at the loading station is detached from the adapter valve, the spring mechanism 116 in the control valve 110 automatically moves the plunger toward closed position, thus shutting off the air supply to the exit port 118.

From the foregoing description and accompanying drawings, it will be seen that the invention provides a novel adapter valve arrangement for mounting on the exterior of a transportation tank for liquid, such as for instance a gasoline or oil tank, and which provides for expeditious coupling with a compatible loading coupler at a loading island, and which includes a manually operable actuator mechanism for selectively actuating the poppet valve of the adapter valve, and for holding the poppet thereof in predetermined open condition. The invention also provides an adapter valve of the above discussed type wherein the flow of liquid through the valve is maximized by having minimum structural interference in the flow passageway through the valve, while still providing for effective closing the liquid entry opening of the adapter valve.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. A fabricated adapter valve for controlling flow of liquid to and from a transportation tank comprising, a hollow body portion, a coupling portion secured to one end of the body portion in liquid tight relation, said coupling portion being adapted for coupling to a compatible loading coupler of a loading island for liquids, a flange portion secured in liquid tight relation to the other end of said body portion adapted for coupling to a liquid flow conduit to the tank, said flange portion defining an exit opening for liquid, said coupling portion having a liquid inlet opening therein, valve means mounted in said body portion intermediate said inlet and said exit openings for opening and closing said inlet opening and including biasing means automatically urging said valve means toward closed condition, a manually operable actuator mounted on said valve and accessible from exteriorly of said valve, said actuator including cam means pivotal in said body portion about a fixed point and coacting with said valve means for moving said valve means toward open position against the resistance of said biasing means, and means for selectively maintaining said valve means in open condition while permitting release of said actuator by an operator, the last mentioned maintaining means including a generally sinuous configuration on said cam means adapted for holding coaction with said valve means.

2. A valve in accordance with claim 1 wherein said body portion comprises an open ended cylindrical tube, said coupling portion and said flange portion being secured by welds to said tube at the respective end thereof, to form a liquid tight connection therebetween.

3. A valve in accordance with claim 1 wherein said valve means includes a poppet mounted in said body portion by means of a spider comprising spaced generally radially extending arms supporting an elongated sleeve generally centrally of said body portion, said poppet including an elongated stem received in sliding relation in said sleeve for mounting the poppet in said body portion, a spring comprising said biasing means urging the poppet forwardly toward closed position in said inlet opening, said cam means extending interiorly of said body portion and coacting with a slot in the poppet stem, and abutment means on the stem adapted for coaction with said cam means for moving the poppet rearwardly against the resistance to compression of said biasing means, said cam means including a generally arcuate arm the concave side of which faces in the direction of said inlet opening, and the convex side of which faces in the direction of said exit opening, with said sinuous configuration being on said convex side of said arm in opposed relation to said abutment means, said sinuous configuration providing a plurality of spaced abutments for engagement with said abutment means on said poppet stem, for holding the poppet in predetermined open conditions when placed therein by said actuator, said slot being of sufficient length to provide for substantial rearward movement of said poppet relative to said arm during non-actuation of said actuator by an operator and without abutting engagement of said concave side of said arm with the forward slot defining surface of said stem.

4. A valve in accordance with claim 1 wherein said cam means comprises an arcuate arm and said actuator comprises a shaft rotatably journaled in a bearing projecting laterally outwardly with respect to said body portion, said arm being secured to said shaft, sealing means coacting with said shaft and sealing said valve body portion at said shaft, said actuator including an operating handle connected to said shaft for providing for selective rotation of said shaft about said fixed point, said sinuous configuration being located on said arm.

5. A valve in accordance with claim 4 wherein said sinuous configuration comprises a series of three spaced projections on said arm spaced from one another by valley portions and disposed on the rearward edge of said arm, said sinuous configuration providing for at least two open positions of said valve means.

6. A valve in accordance with claim 2 wherein said actuator includes a handle pivoted to said body portion for swinging movement relative to said body portion in a generally vertical plane about said fixed point, said valve means comprising a poppet including a head portion and a stem portion projecting axially rearwardly from said head portion, a spider including an elongated sleeve mounted interiorly of said body portion, said stem portion being received in sliding guided relation in said sleeve, and having a vertically oriented slot therethrough in which is received said cam means, the latter including a generally arcuate, vertically oriented arm pivotal with said handle about said fixed point, the concave side of said arm facing in the direction of said inlet opening, and the convex side of said arm facing in the direction of said exit opening, said maintaining means including an abutment roller rotatably mounted to said stem in said slot, and adapted for engagement with said sinuous-like configuration the latter being disposed on said convex side of said arm, said sinuous-like configuration comprising vertically spaced projections and valleys, said maintaining means being adapted to hold said poppet in a plurality of open positions and being so arranged that the engagement of said roller with said sinuous-like surface in each of said open positions of said poppet is such that the effective force of said roller against said sinuous surface is disposed in a plane generally rearwardly of the pivotal axis of said actuator handle, said slot being of sufficient length to provide for substantial rearward movement of said poppet relative to said arm during non-actuation of said actuator by an operator, and without abutting engagement of said concave side of said arm with the forward slot defining surface of said stem portion.

7. A valve in accordance with claim 6 wherein said poppet includes a sealing ring and means securing the sealing ring in position on the poppet head portion, said inlet opening being defined by a deep tapered surface so as to prevent binding between the poppet head portion and the inlet opening when the poppet is in closed condition, means exteriorly accessible from the adapter valve for convenient replacement of the sealing ring on the poppet head portion, said arm being of such length and being so disposed with respect to said fixed pivot point that said arm is swingable through said exit opening upon predetermined actuation of said handle for moving said valve means from said closed condition.

8. A valve in accordance with claim 6 including a stuffing box bearing projecting laterally from the body portion of said adapter valve, a rotatable shaft mounted in said bearing, means sealingly coacting with said shaft to prevent egress of liquid from interiorly of the body portion along the bearing, said shaft being coupled at one end thereof to said handle and at the other end thereof supporting said arm and providing said pivotal axis.

9. A valve in accordance with claim 1 including a fluid control valve mounted on said body portion and adapted for activation by the loading coupler of a loading island upon coupling of said coupling portion to the loading coupler, said fluid control valve being adapted to automatically control actuation of an associated device coincident with said coupling operation.

10. A valve in accordance with claim 9 wherein said fluid control valve comprises a threaded portion received in threaded mounted relation on a complementary threaded flange projecting laterally from said body portion, and also comprising a spring loaded plunger spool for controlling the flow of activating fluid to and from the associated device, said spool being actuated from inactive position to active position by the loading coupler and being automatically returned to inactive position by spring means upon separation of said coupling portion and the loading coupler.

* * * * *